United States Patent
Seki et al.

(10) Patent No.: US 10,211,456 B2
(45) Date of Patent: Feb. 19, 2019

(54) POSITIVE ELECTRODE ACTIVE MATERIAL FOR LITHIUM ION SECONDARY BATTERY, AND LITHIUM ION SECONDARY BATTERY POSITIVE ELECTRODE AND LITHIUM ION SECONDARY BATTERY USING THE SAME

(71) Applicant: TDK CORPORATION, Tokyo (JP)

(72) Inventors: Hideaki Seki, Tokyo (JP); Akinobu Nojima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/438,011

(22) Filed: Feb. 21, 2017

(65) Prior Publication Data

US 2017/0288214 A1    Oct. 5, 2017

(30) Foreign Application Priority Data

Mar. 30, 2016 (JP) ................................ 2016-067805
Dec. 26, 2016 (JP) ................................ 2016-250327

(51) Int. Cl.

| | |
|---|---|
| *H01M 4/36* | (2006.01) |
| *H01M 4/505* | (2010.01) |
| *H01M 4/525* | (2010.01) |
| *H01M 4/58* | (2010.01) |
| *H01M 10/0525* | (2010.01) |
| *H01M 4/13* | (2010.01) |

(52) U.S. Cl.
CPC ............ *H01M 4/366* (2013.01); *H01M 4/13* (2013.01); *H01M 4/364* (2013.01); *H01M 4/505* (2013.01); *H01M 4/525* (2013.01); *H01M 4/5825* (2013.01); *H01M 10/0525* (2013.01)

(58) Field of Classification Search
CPC ...... H01M 4/366; H01M 4/505; H01M 4/525; H01M 4/5825; H01M 2004/028; H01M 10/0525

See application file for complete search history.

(56) References Cited

U.S. PATENT DOCUMENTS

| | | | |
|---|---|---|---|
| 2007/0015058 A1 | 1/2007 | Takezawa et al. | |
| 2015/0263337 A1* | 9/2015 | Naoi ..................... | H01M 4/364 429/231.1 |

FOREIGN PATENT DOCUMENTS

JP        2007-048744 A        2/2007

* cited by examiner

*Primary Examiner* — Brittany L Raymond
(74) *Attorney, Agent, or Firm* — Oliff PLC

(57) ABSTRACT

A positive electrode active material for a lithium ion secondary battery contains: a first compound represented by chemical formula $Li_x(Ni_yMa_{1-y})O_2$ ($0.95 \leq x \leq 1.05$, $0.70 \leq y \leq 0.95$, where Ma is at least one element selected from Co, Mn, V, Ti, Fe, Zr, Nb, Mo, Al, and W); and a second compound represented by chemical formula $LiVOPO_4$. $W > 5.0°$ C., where W is a full width at half maximum of an exothermic peak obtained between 150° C. and 260° C. by differential scanning calorimetry (DSC) performed on a mixture of the first compound and the second compound under a condition of 5° C./min.

5 Claims, 2 Drawing Sheets

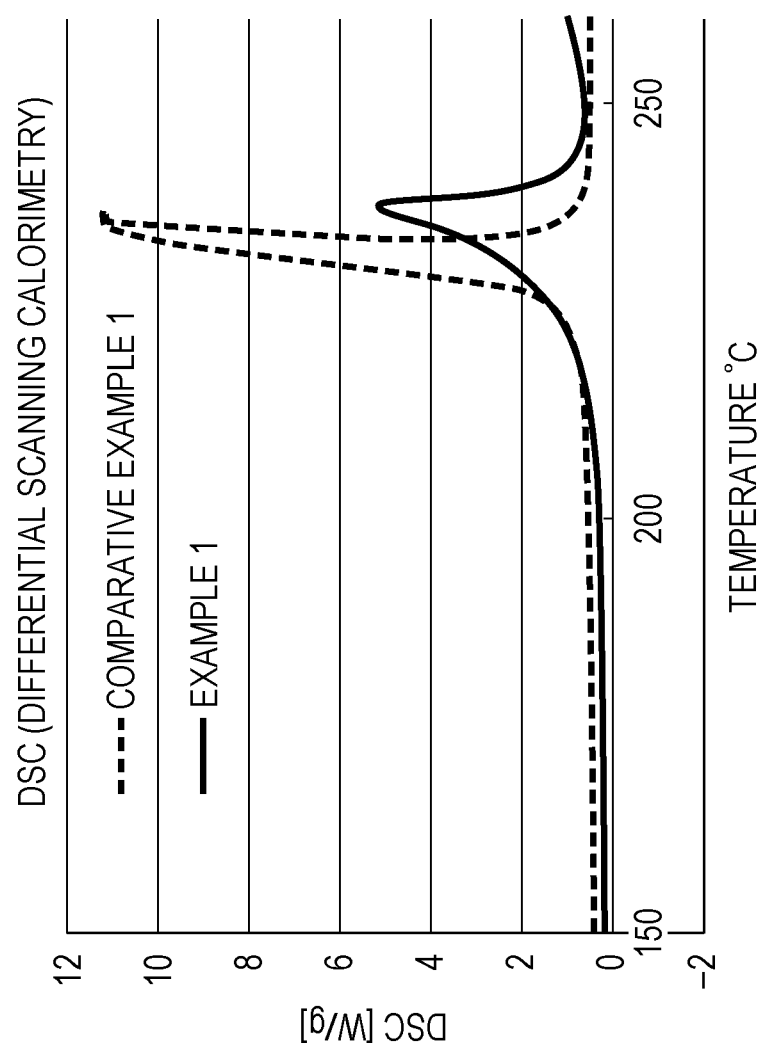

POSITIVE ELECTRODE ACTIVE MATERIAL FOR LITHIUM ION SECONDARY BATTERY, AND LITHIUM ION SECONDARY BATTERY POSITIVE ELECTRODE AND LITHIUM ION SECONDARY BATTERY USING THE SAME

CROSS-REFERENCE TO RELATED APPLICATION

This application claims priority from Japanese Patent Application Nos. 2016-067805 filed on Mar. 30, 2016 and 2016-250327 on Dec. 26, 2016, with the Japan Patent Office the entire contents of which are hereby incorporated by reference.

BACKGROUND

1. Technical Field

The present disclosure relates to a positive electrode active material for a lithium ion secondary battery, and a lithium ion secondary battery positive electrode and lithium ion secondary battery using the same.

2. Description of the Related Art

It is known that, compared with lithium cobaltate $LiCoO_2$, which is a representative existing active material for lithium ion secondary batteries, a greater charging/discharging capacity can be obtained when a lithium nickel complex oxide containing Ni, Co, and Mn or Ni, Co, and Al, for example, is used as an active material.

However, in the case of a lithium nickel complex oxide, the start temperature of thermal decomposition is low compared with lithium cobaltate. In addition, Ni at the time of charging has a valence of 4, resulting in low crystal structure stability. Accordingly, in the lithium nickel complex oxide, degradation due to cycling is increased. In the positive electrode active material during charging, Li ions deintercalate and electrons are produced. Accordingly, a large amount of heat is generated around the active material, and it is estimated that energy corresponding to the start temperature of thermal decomposition is partially yielded. Consequently, degradation by heat can also be expected.

In order to improve the problem of instability of the lithium nickel complex oxide, according to a known technology, the lithium nickel complex oxide is combined with a material having good thermal stability. Examples of the material include a spinel compound, such as $LiMn_2O_4$, and a phosphate compound, such as $LiFePO_4$.

JP-A-2007-48744 describes an approach for obtaining high reliability whereby the lithium nickel complex oxide and a spinel compound or phosphate compound having good thermal stability are combined and formed into multiple layers. However, according to the technique of JP-A-2007-48744, while thermal stability of an electrode as a whole can be increased, the effect is significantly reduced in fine regions, such as around the active material. Accordingly, no improvement in cycle characteristics is achieved. In addition, according to the technique of JP-A-2007-48744, the occupancy ratio of the spinel compound or phosphate compound in the electrode as a whole is relatively high. This may lead to the problem of a decrease in discharge capacity. Thus, there is a demand for further increasing the capacity and improving the cycle characteristics of a mixed-system positive electrode active material including a lithium nickel complex oxide and a material having good thermal stability.

SUMMARY

A positive electrode active material for a lithium ion secondary battery contains: a first compound represented by chemical formula $Li_x(Ni_yMa_{1-y})O_2$ (0.95≤x≤1.05, 0.70≤y≤0.95, where Ma is at least one element selected from Co, Mn, V, Ti, Fe, Zr, Nb, Mo, Al, and W); and a second compound represented by chemical formula $LiVOPO_4$. W>5.0° C., where W is a full width at half maximum of an exothermic peak obtained between 150° C. and 260° C. by differential scanning calorimetry (DSC) performed on a mixture of the first compound and the second compound under a condition of 5° C./min.

BRIEF DESCRIPTION OF THE DRAWINGS

FIG. 2 illustrates the results of DSC measurement of the positive electrode active material according to the embodiment of the present disclosure.

DESCRIPTION OF THE EMBODIMENTS

Figure 1:
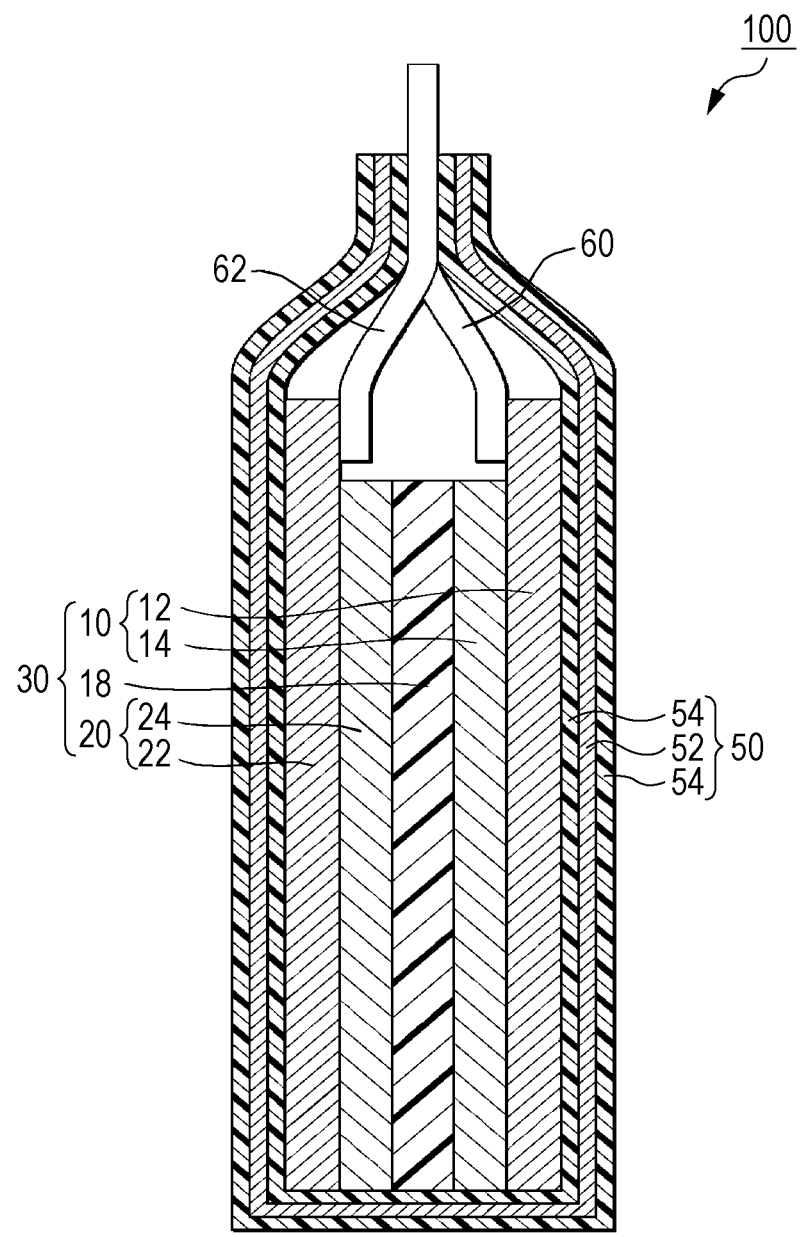
FIG. 1 is a schematic cross sectional view of a lithium ion secondary battery provided with a positive electrode according to an embodiment of the present disclosure and a negative electrode.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a positive electrode active material that is excellent in terms of discharge capacity and cycle characteristics, and a positive electrode and lithium ion secondary battery using the same.

A positive electrode active material for a lithium ion secondary battery according to one aspect of the present disclosure (the present positive electrode active material) contains: a first compound represented by chemical formula $Li_x(Ni_yMa_{1-y})O_2$ (0.95≤x≤1.05, 0.70≤y≤0.95, where Ma is at least one element selected from Co, Mn, V, Ti, Fe, Zr, Nb, Mo, Al, and W); and a second compound represented by chemical formula $LiVOPO_4$. W>5.0° C., where W is a full width at half maximum of an exothermic peak obtained between 150° C. and 260° C. by differential scanning calorimetry (DSC) performed on a mixture of the first compound and the second compound under a condition of 5° C./min.

In the present positive electrode active material, the first compound and the second compound having good thermal stability co-exist. Accordingly, rapid heat generation at the time of charging is suppressed, whereby crystal structure distortion is reduced and the valence variation of transition metals such as Ni and Co is reduced. Consequently, the crystal structure of the active material can be stabilized. As a result, elution of transition metals and deintercalation of oxygen are suppressed, whereby, it is believed, excellent cycle characteristics can be achieved.

In the present positive electrode active material, the second compound may have a content of 1 to 30 wt % with respect to a sum of a weight of the first compound and a weight of the second compound.

When the content of the second compound satisfies the above ranges, the first compound having high capacity and the second compound having good thermal stability co-exist in a well-balanced manner. Accordingly, both high cycle characteristics and excellent discharge capacity can be achieved.

In the present positive electrode active material, at least a part of a surface of a primary particle of the first compound may be coated with the second compound so as to form a coating layer of the second compound in the part.

Differential scanning calorimetry (DSC) indicates that the first compound tends to generate heat on the lower temperature side compared with the second compound, and the amount of heat generated is high and the rate of heat generation also tends to be high. It is believed that, when the surface of the first compound is coated with the second compound, the special function of the second compound directly acts on the instability factor of the first compound, whereby the rapid heat generation is suppressed. Consequently, the structural destabilization of the active material is further suppressed, and excellent cycle characteristics can be exhibited. This mechanism is not necessarily clarified. It is speculated that the mechanism is due to the flexibility of the V (vanadium) of $LiVOPO_4$ as the second compound being able to take various valence values.

The primary particles of the first compound may be aggregated so as to form a secondary particle, and at least a part of a surface of the secondary particle may be coated with the second compound so as to form a coating layer of the second compound in the part.

When a secondary particle of the first compound is formed, and the second compound is present in at least a part of the secondary particle surface, a positive electrode active material that is excellent in terms of energy density and cycle characteristics can be obtained.

The positive electrode active material for a lithium ion secondary battery may be contained in a positive electrode.

In this configuration, a positive electrode having excellent cycle characteristics can be obtained.

A lithium ion secondary battery according to one aspect of the present disclosure may be provided with a positive electrode including the present positive electrode active material; a negative electrode including a negative electrode active material; a separator interposed between the positive electrode and the negative electrode; and a nonaqueous electrolyte.

In this configuration, a lithium ion secondary battery having excellent cycle characteristics can be obtained.

According to the present disclosure, a positive electrode active material that is excellent in terms of discharge capacity and cycle characteristics, and a positive electrode and lithium ion secondary battery using the same can be provided.

In the following, a preferred embodiment of the present disclosure will be described with reference to the drawings. The technology of the present disclosure, however, is not limited to the following embodiment. The constituent elements which will be described below may include those that may readily occur to those skilled in the art, and those substantially identical to the constituent elements. The constituent elements described below may be combined as appropriate.

(Lithium Ion Secondary Battery)

FIG. 1 is a schematic cross sectional view of a lithium ion secondary battery according to the present embodiment. As illustrated in FIG. 1, the lithium ion secondary battery 100 is mainly provided with a stacked body 30; a case 50 in which the stacked body 30 is housed in a sealed state; and a pair of leads 60, 62 connected to the stacked body 30.

In the stacked body 30, a pair of positive electrode 10 and negative electrode 20 is disposed opposing each other across a separator 18. The positive electrode 10 includes a planar (film-like) positive electrode current collector 12, and a positive electrode active material layer 14 disposed on the positive electrode current collector 12. The negative electrode 20 includes a planar (film-like) negative electrode current collector 22, and a negative electrode active material layer 24 disposed on the negative electrode current collector 22. A major surface of the positive electrode active material layer 14 and a major surface of the negative electrode active material layer 24 are respectively in contact with major surfaces of the separator 18. To ends of the positive electrode current collector 12 and negative electrode current collector 22, leads 62, 60 are respectively connected. Ends of the leads 60, 62 extend to the outside of the case 50.

In the following, the positive electrode active material and/or the negative electrode active material may be generally referred to as the active material. The positive electrode active material layer 14 and/or the negative electrode active material layer 24 may be generally referred to as the active material layer. In addition, the positive electrode 10 and/or the negative electrode 20 may be generally referred to as the electrode.

(Positive Electrode Active Material Layer)

The positive electrode active material layer 14 is mainly configured from a positive electrode active material, a binder, and a required amount of positive electrode conductive auxiliary agent.

(Positive Electrode Active Material)

The positive electrode active material of the present embodiment contains a first compound represented by chemical formula $Li_x(Ni_yMa_{1-y})O_2$ (0.95≤x≤1.05, 0.70≤y≤0.95, where Ma is at least one element selected from Co, Mn, V, Ti, Fe, Zr, Nb, Mo, Al, and W), and a second compound represented by chemical formula $LiVOPO_4$. W>5.0° C., where W is a full width at half maximum of an exothermic peak obtained between 150° C. and 260° C. by differential scanning calorimetry (DSC) performed on a mixture of the first compound and the second compound under a condition of 5° C./min.

In the positive electrode active material of the present embodiment, the first compound and the second compound having good thermal stability co-exist. Accordingly, rapid heat generation at the time of charging is suppressed, whereby crystal structure distortion is reduced and the valence variation of transition metals such as Ni and Co is reduced. Consequently, the crystal structure of the active material can be stabilized. As a result, elution of transition metals and deintercalation of oxygen are suppressed, whereby, it is believed, excellent cycle characteristics can be achieved.

(Measurement for Differential Scanning Calorimetry (DSC))

Differential scanning calorimetry (DSC) is implemented according to the following method. First, an electrode including the positive electrode active material of the present embodiment, conductive auxiliary agent, and polyvinylidene fluoride (PVDF) is prepared. The method for fabricating the electrode will be described later. The electrode is then weighed, and a predetermined quantity of the electrode is obtained. The electrode is put into an aluminum container (measuring container), a predetermined amount of electrolyte is added into the container, and an aluminum lid is placed over the container and swaged. The measuring container is set on a DSC device (Thermo Plus DSC8230 from RIGAKU), and DSC measurement is implemented at a temperature increase rate of 5° C./min. Of the peaks obtained by DSC measurement, the full width at half maximum of a peak that appears in a range of 150° C. to 260° C. is calculated.

The content of the second compound in the present embodiment may be 1 to 30 wt % with respect to the sum of the weight of the first compound and the weight of the second compound. The content of the second compound may be in a range of 2.5 to 30.0 wt %. In this way, the cycle characteristics are further improved. In addition, the content of the second compound may be in a range of 5 to 30.0 wt %. In this way, the cycle characteristics are further improved.

When the content of the second compound satisfies the above ranges, the first compound having high capacity and the second compound having good thermal stability co-exist in a well-balanced manner. Accordingly, both high cycle characteristics and excellent discharge capacity can be achieved.

In the present embodiment, at least a part of a surface of a primary particle of the first compound may be coated with the second compound, and a coating layer of the second compound may be formed in the part. That is, a coating layer of the second compound may be formed in at least a part of a surface of the primary particle of the first compound.

Differential scanning calorimetry (DSC) indicates that the first compound tends to generate heat on the lower temperature side compared with the second compound, and the amount of heat generated is high and the rate of heat generation also tends to be high. It is believed that, when the surface of the first compound is coated with the second compound, the special function of the second compound directly acts on the instability factor of the first compound, whereby the rapid heat generation is suppressed. Consequently, the structural destabilization of the active material is further suppressed, and excellent cycle characteristics can be exhibited.

Examples of the method for coating the surface of the first compound $Li_x(Ni_yMa_{1-y})O_2$ with the second compound $LiVOPO_4$ include dry mixing using a pot mill containing zirconium balls or alumina balls; dry mixing using an automated mortar; coating using a fluidized-bed device; and particle compounding by mechanofusion. After the coating process, a heating process may be performed as appropriate to enhance the stability of the coating of the second compound. Heating process conditions may include a heating process temperature in a range of 300° C. to 500° C., and a processing atmosphere of air or oxygen.

In the present embodiment, primary particles of the first compound may aggregate to form a secondary particle, and at least a part of a surface of the secondary particle may be coated with the second compound, thereby forming a coating layer of the second compound in the part. That is, a coating layer of the second compound may be formed in at least a part of the surface of the secondary particle of the first compound.

Formation of the secondary particle of the first compound makes it possible to obtain a positive electrode active material that is excellent in terms of energy density and cycle characteristics.

(Positive Electrode Current Collector)

The positive electrode current collector 12 may be a conductive plate material. Examples of the positive electrode current collector 12 include metal thin plates (metal foils) of aluminum or aluminum alloy, stainless steel and the like.

(Positive Electrode Binder)

The binder is not particularly limited, and is only required to be able to bind the positive electrode active material and the conductive material onto the positive electrode current collector 12. As the binder, known binders may be used. Examples of the binder are fluorine resins such as polyvinylidene fluoride (PVDF), polytetrafluoroethylene (PTFE), and polyvinylidene fluoride-hexafluoropropylene copolymer.

(Positive Electrode Conductive Auxiliary Agent)

The positive electrode conductive auxiliary agent is also not particularly limited, and is only required to be able to increase the conductivity of the positive electrode active material layer 14. As the positive electrode conductive auxiliary agent, known conductive auxiliary agents may be used. Examples of the positive electrode conductive auxiliary agent include carbon-based materials such as graphite, carbon black, and graphene; metal fine powders of copper, nickel, stainless steel, iron and the like; mixtures of carbon material and metal fine powder; and conductive oxides such as ITO.

(Negative Electrode Active Material Layer)

The negative electrode active material layer 24 is mainly configured from a negative electrode active material, a binder, and a required amount of conductive auxiliary agent.

(Negative Electrode Active Material)

As the negative electrode active material, for example, a substance capable of lithium ion intercalation and deintercalation may be used. Examples of the negative electrode active material include carbon materials such as graphite, hard carbon, soft carbon, and low-temperature heat-treated carbon; metals capable of combining with lithium, such as Al, Si, and Sn; amorphous compounds mainly containing oxide, such as SiO, $SiO_2$, $SnO_2$, and $Fe_2O_3$; and particles including $Li_4Ti_5O_{12}$.

(Negative Electrode Current Collector)

The negative electrode current collector 22 may be a conductive plate material. As the negative electrode current collector 22, for example, metal thin plates (metal foils) of copper, nickel, stainless steel, or alloys thereof may be used.

(Negative Electrode Binder)

Examples of the binder material may include, in addition to the aforementioned examples of the material for the positive electrode binder, cellulose; styrene/butadiene rubber; ethylene/propylene rubber; polyimide resin; polyamide-imide resin; and polyacrylic acid.

(Negative Electrode Conductive Auxiliary Agent)

The negative electrode conductive auxiliary agent is not particularly limited. As the negative electrode conductive auxiliary agent, known conductive auxiliary agents may be used. Examples of the negative electrode conductive auxiliary agent include carbon materials such as thermal decomposition carbon including carbon black; cokes; glassy carbons; organic polymer compound heat-treated materials; carbon fibers; and activated charcoal. A negative electrode active material such as hard carbon, soft carbon, or graphite may be formed in a different shape and added as a negative electrode conductive auxiliary agent.

Using the aforementioned constituent elements, the electrode can be fabricated by a regular method. For example, the electrode can be manufactured by applying a paint including the active material (positive electrode active material or negative electrode active material), binder (positive electrode binder or negative electrode binder), solvent, and conductive auxiliary agent (positive electrode conductive auxiliary agent or negative electrode conductive auxiliary agent) onto the current collector, and removing the solvent from the paint applied onto the current collector.

Examples of the solvent include N-methyl-2-pyrrolidone, N,N-dimethylformamide, and water.

The application method is not particularly limited, and a method normally adopted for electrode fabrication may be used. Examples of the method include a slit die coating method and a doctor blade method.

The method for removing the solvent in the paint applied onto the current collector is not particularly limited. For example, the current collector with the paint applied thereto is dried in an atmosphere of 80° C. to 150° C.

The electrode having the active material layer formed thereon may be subjected to a press process as needed, using a roll press device and the like. The roll press may use a linear pressure of 100 to 2,000 kgf/cm, for example.

Other constituent elements of the lithium ion secondary battery 100 will be described.

(Separator)

The separator 18 may be formed from electric insulating material having a porous structure. Examples of the material include a single-layer body or a stacked body of films of polyethylene, polypropylene, or polyolefin; an extended film of a mixture of the resins; and fibrous nonwoven fabric including at least one constituent material selected from the group consisting of cellulose, polyester, and polypropylene.

(Electrolyte)

The electrolyte is contained in the positive electrode active material layer 14, the negative electrode active material layer 24, and the separator 18. The electrolyte is not particularly limited. In the present embodiment, as the electrolyte, an electrolyte including lithium salt may be used, for example. It should be noted, however, that in the case of electrolyte aqueous solution, the electrochemical decomposition voltage is low, so that the withstand voltage at the time of charging is limited to a lower value. Accordingly, the electrolyte may be an electrolyte including an organic solvent. The electrolyte to be used may be an organic solvent in which lithium salt is dissolved. Examples of the lithium salt include salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used individually or in combination of two or more salts.

Examples of the organic solvent include propylene carbonate, ethylene carbonate, diethyl carbonate, dimethyl carbonate, and methylethyl carbonate. These organic solvents may be used individually or in a mixture of two or more of the organic solvents mixed at an arbitrary ratio.

In the present embodiment, the electrolyte has been described with reference to examples thereof. As the electrolyte, a gel electrolyte having a gelation agent added therein may be used. Instead of the electrolyte, a solid electrolyte may be used.

(Case)

The case 50 seals the stacked body 30 and the electrolyte therein. The case 50 is not particularly limited and is only required to be able to stop leakage of electrolyte to the outside, and entry of water and the like from the outside into the lithium ion secondary battery 100. For example, as illustrated in FIG. 1, as the case 50, a metal laminate film including a metal foil 52 and a polymer film 54 coating both sides of the metal foil 52 may be utilized. For example, as the metal foil 52, aluminum foil may be utilized, and as the polymer film (synthetic resin film) 54, a film of polypropylene and the like may be utilized. For example, the material of the outer polymer film 54 may be polymer having a high melting point, such as polyethylene terephthalate (PET) or polyamide. The material of the inner polymer film 54 may be polyethylene or polypropylene.

(Leads)

The leads 60, 62 are formed from conductive material such as aluminum. An example method for manufacturing the lithium ion secondary battery 100 will be described. The leads 62, 60 are respectively welded to the positive electrode current collector 12 and the negative electrode current collector 22 by a known method. The separator 18 is interposed between the positive electrode active material layer 14 of the positive electrode 10 and the negative electrode active material layer 24 of the negative electrode 20. In this state, the positive electrode 10, the negative electrode 20, and the separator 18 are inserted into the case 50 together with the electrolyte, and the entry opening of the case 50 is sealed.

The lithium ion secondary battery 100 of the present embodiment may be provided with the positive electrode 10, the negative electrode 20 including the negative electrode active material, the separator 18 interposed between the positive electrode and the negative electrode, and a non-aqueous electrolyte.

By combining the positive electrode 10 with the electrolyte and the negative electrode 20, the lithium ion secondary battery that is excellent in terms of discharge capacity and cycle characteristics can be obtained.

While a preferred embodiment of the present disclosure has been described, the technology of the present disclosure is not limited to the embodiment. For example, the lithium ion secondary battery is not limited to the shape illustrated in FIG. 1. The lithium ion secondary battery may be of a coin type including stacked layers of electrodes and separator that have been punched into coin shape, and a cylinder type including electrode sheets and separator that are wound in spiral shape.

EXAMPLES

The technology of the present disclosure will be described in more concrete terms with reference to examples and comparative examples. However, the technology of the present disclosure is not limited to the following examples.

Example 1

(Fabrication of Positive Electrode Active Material)

With respect to 100 g of $Li_{1.00}(Ni_{0.85}Co_{0.10}Al_{0.05})O_2$ forming secondary particles as the first compound, $LiVOPO_4$ as the second compound was added, thereby obtaining a mixture. The amount added of the second compound was set so that the weight of the second compound had a weight ratio of 5.0 wt % with respect to the sum of the weight of the first compound and the weight of the second compound. Then, using a mechanofusion system from Hosokawa Micron Corporation, the mixture was subjected to a particle compounding process under the rotational speed condition of 1,500 rpm. After the particle compounding process, the mixture was subjected to a heating process in an oxygen airflow at the condition of 350° C. for 10 minutes. In this way, the positive electrode active material according to Example 1 was obtained.

(Fabrication of Positive Electrode)

A mixture of the positive electrode active material according to Example 1, polyvinylidene fluoride (PVDF) as the binder, and acetylene black was dispersed in a solvent of N-methyl-2-pyrrolidone (NMP), thereby preparing a slurry. The slurry was prepared such that the positive electrode active material, acetylene black, and PVDF had a weight ratio of 92:3:5. The slurry was applied onto an aluminum foil serving as the positive electrode current collector, and then dried. Thereafter, the aluminum foil coated with the slurry was rolled. In this way, the positive electrode with the active material layer including the positive electrode active material formed thereon was obtained.

(Fabrication of Negative Electrode)

A mixture of graphite as the negative electrode active material, styrene/butadiene rubber and cellulose as binders, and carbon black as the conductive auxiliary agent was dispersed in pure water as the solvent, thereby preparing a slurry. The slurry was applied onto a copper foil as the negative electrode current collector, and then dried. Thereafter, the copper foil coated with the slurry was rolled. In this way, the negative electrode with the active material layer including the negative electrode active material formed thereon was obtained.

(Fabrication of Evaluation Cell)

The positive electrode and the negative electrode prepared as described above, and the separator made of a polyethylene porous film were cut into predetermined sizes. Four layers of the negative electrode and three layers of the positive electrode were stacked via the separator in the order of the negative electrode, the separator, the positive electrode, the separator, and the negative electrode, thereby obtaining a stacked body. The stacked body was put into an aluminum laminate pack, and an electrolyte solution was injected into the aluminum laminate pack. Thereafter, the aluminum laminate pack was vacuum-sealed. In this way, a lithium ion secondary battery using the positive electrode active material of Example 1 was fabricated. As the electrolyte solution, a solvent mixture of ethylene carbonate (EC) and diethyl carbonate (DEC) in which $LiPF_6$ with a concentration of 1 M (1 mol/L) had been dissolved was used. The volume ratio of EC and DEC in the solvent mixture was EC:DEC=30:70.

Example 2

An evaluation cell was fabricated by the same method as in Example 1 with the exception that the weight ratio of the second compound was 2.5 wt %.

Example 3

An evaluation cell was fabricated by the same method as in Example 1 with the exception that the weight ratio of the second compound was 7.5 wt %.

Example 4

An evaluation cell was fabricated by the same method as in Example 1 with the exception that the weight ratio of the second compound was 1.0 wt %.

Example 5

An evaluation cell was fabricated by the same method as in Example 1 with the exception that the weight ratio of the second compound was 10.0 wt %.

Example 6

An evaluation cell was fabricated by the same method as in Example 1 with the exception that the weight ratio of the second compound was 15.0 wt %.

Example 7

An evaluation cell was fabricated by the same method as in Example 1 with the exception that the weight ratio of the second compound was 30.0 wt %.

Example 8

An evaluation cell was fabricated by the same method as in Example 1 with the exception that the first compound was modified to $Li_{1.00}(Ni_{0.80}Co_{0.10}Mn_{0.10})O_2$.

Example 9

An evaluation cell was fabricated by the same method as in Example 1 with the exception that the first compound was modified to $Li_{1.00}(Ni_{0.80}Co_{0.10}Mn_{0.10})O_2$, and that the weight ratio of the second compound was 2.5 wt %.

Example 10

An evaluation cell was fabricated by the same method as in Example 1 with the exception that the first compound was modified to $Li_{1.00}(Ni_{0.80}Co_{0.10}Mn_{0.10})O_2$, and that the weight ratio of the second compound was 7.5 wt %.

Example 11

An evaluation cell was fabricated by the same method as in Example 1 with the exception that the first compound was modified to $Li_{1.00}(Ni_{0.80}Co_{0.10}Mn_{0.10})O_2$, and that the weight ratio of the second compound was 1.0 wt %.

Example 12

An evaluation cell was fabricated by the same method as in Example 1 with the exception that the first compound was modified to $Li_{1.00}(Ni_{0.80}Co_{0.10}Mn_{0.10})O_2$, and that the weight ratio of the second compound was 10.0 wt %.

Example 13

An evaluation cell was fabricated by the same method as in Example 1 with the exception that the first compound was modified to $Li_{1.00}(Ni_{0.80}Co_{0.10}Mn_{0.10})O_2$, and that the weight ratio of the second compound was 15.0 wt %.

Example 14

An evaluation cell was fabricated by the same method as in Example 1 with the exception that the first compound was modified to $Li_{1.00}(Ni_{0.80}Co_{0.10}Mn_{0.10})O_2$, and that the weight ratio of the second compound was 30.0 wt %.

Example 15

An evaluation cell was fabricated by the same method as in Example 1 with the exception that the mechanofusion process and heating process for the first compound and the second compound were not implemented.

Example 16

An evaluation cell was fabricated by the same method as in Example 1 with the exception that the mechanofusion process and the heating process for the first compound and the second compound were not implemented, and that the weight ratio of the second compound was 2.5 wt %.

Example 17

An evaluation cell was fabricated by the same method as in Example 1 with the exception that the mechanofusion process and the heating process for the first compound and the second compound were not implemented, and that the weight ratio of the second compound was 7.5 wt %.

Example 18

An evaluation cell was fabricated by the same method as in Example 1 with the exception that the mechanofusion process and the heating process for the first compound and the second compound were not implemented, and that the weight ratio of the second compound was 1.0 wt %.

Example 19

An evaluation cell was fabricated by the same method as in Example 1 with the exception that the mechanofusion process and the heating process for the first compound and the second compound were not implemented, and that the weight ratio of the second compound was 10.0 wt %.

Example 20

An evaluation cell was fabricated by the same method as in Example 1 with the exception that the mechanofusion process and the heating process for the first compound and the second compound were not implemented, and that the weight ratio of the second compound was 15.0 wt %.

Example 21

An evaluation cell was fabricated by the same method as in Example 1 with the exception that the mechanofusion process and the heating process for the first compound and the second compound were not implemented, and that the weight ratio of the second compound was 30.0 wt %.

Example 22

An evaluation cell was fabricated by the same method as in Example 1 with the exception that the particle form of the first compound was primary particle rather than secondary particle.

Example 23

An evaluation cell was fabricated by the same method as in Example 1 with the exception that the particle form of the first compound was primary particle rather than secondary particle, and that the weight ratio of the second compound was 1.0 wt %.

Example 24

An evaluation cell was fabricated by the same method as in Example 1 with the exception that the particle form of the first compound was primary particle rather than secondary particle, and that the weight ratio of the second compound was 30.0 wt %.

Example 25

An evaluation cell was fabricated by the same method as in Example 1 with the exception that the weight ratio of the second compound was 50 wt %.

Example 26

An evaluation cell was fabricated by the same method as in Example 1 with the exception that the first compound was modified to $Li_{1.00}(Ni_{0.80}Co_{0.10}Mn_{0.10})O_2$, and that the weight ratio of the second compound was 40.0 wt %.

Comparative Example 1

An evaluation cell was fabricated by the same method as in Example 1 with the exception that the second compound was not added.

Comparative Example 2

An evaluation cell was fabricated by the same method as in Example 1 with the exception that the first compound was modified to $Li_{1.00}(Ni_{0.80}Co_{0.10}Mn_{0.10})O_2$, and that the second compound was not added.

(Measurement for DSC (Differential Scanning Calorimetry))

Using the positive electrodes fabricated according to the examples and comparative examples, and an electrolyte solution, a DSC measurement was performed. First, 10 mg of the electrodes obtained by weighing was put into an aluminum container (measuring container), and 1 µl of electrolyte solution was added into the container. Thereafter, an aluminum lid was placed over the container and swaged. The measuring container was set on a DSC device (Thermo Plus DSC8230 from RIGAKU), and DSC measurement was implemented at a temperature increase rate of 5° C./min. Then, the full width at half maximum (DSC peak full width at half maximum) of a peak obtained by DSC measurement was calculated. FIG. 2 illustrates the DSC peaks of Example 1 and Comparative Example 1.

(Measurement of 0.1 C Discharge Capacity)

With respect to the evaluation lithium ion secondary batteries fabricated according to the examples and comparative examples, the discharge capacity (unit: mAh/g) per active material weight was measured in the case of a discharge rate of 0.1 C (a current value such that the discharge ends in 10 hours when constant-current discharge is performed at 25° C.), using a secondary battery charging/discharging test device (from Hokuto Denko Corp.). The discharge capacity will be referred to as a 0.1 C discharge capacity.

(Cycle Characteristics Evaluation Method)

With respect to the samples of the evaluation lithium ion secondary batteries fabricated according to the examples and comparative examples, a cycle characteristics measurement was performed using the secondary battery charging/discharging test device (from Hokuto Denko Corp.) under an environment of 25° C. Each of the samples was subjected to a charging/discharging cycle of charging with constant-current and constant-voltage at 0.5 C to 4.2 V, followed by constant-current discharge at 1 C to 2.8 V, and the cycle was repeated 100 times. Thereafter, the capacity retention of each sample after 100 cycles was measured. The measured capacity retention after 100 cycles (cycle characteristics) was evaluated as a cycle retention (unit: %). The cycle retention of each sample was measured (evaluated) 5 times by the above method. In addition, an average value of the measurement results was calculated. The average value (average value measured when n=5) was considered the cycle retention (evaluation value) of each sample. That is, the samples were each subjected to the measurement with n=5 with respect to each level, and the average value was considered the evaluation value.

(Determination of Results)

The samples were determined to be "good" where the discharge capacity in the case of 0.1 C constant-current discharge (0.1 C discharge capacity) was not less than 170 mAh/g, and where the capacity retention after 100 cycles (cycle retention) was not less than 80%. On the other hand, the samples were determined to be "defective" where the discharge capacity in the case of 0.1 C constant-current discharge (0.1 C discharge capacity) was less than 170 mAh/g, and where the capacity retention after 100 cycles (cycle retention) was less than 80%.

Table 1 shows the amounts added (content) of the first compound and the second compound, 0.1 C discharge capacity, and cycle retention.

the second compound was contained with respect to the sum of the first compound and the second compound, particularly excellent cycle characteristics and discharge capacity were obtained.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode active material for a lithium ion secondary battery, comprising:

TABLE 1

| | First compound | Content of second compound [wt %] | DSC peak full width at half maximum [° C.] | Second compound coating | Particle form of first compound | 0.1 C discharge capacity [mAh/g] | Cycle retention [%] | Determination |
|---|---|---|---|---|---|---|---|---|
| Example 1 | $Li_{1.00}(Ni_{0.85}Co_{0.10}Al_{0.05})O_2$ | 5.0 | 6.3 | Yes | Secondary particle | 192 | 95 | Good |
| Example 2 | $Li_{1.00}(Ni_{0.85}Co_{0.10}Al_{0.05})O_2$ | 2.5 | 5.6 | Yes | Secondary particle | 185 | 89 | Good |
| Example 3 | $Li_{1.00}(Ni_{0.85}Co_{0.10}Al_{0.05})O_2$ | 7.5 | 7.1 | Yes | Secondary particle | 194 | 93 | Good |
| Example 4 | $Li_{1.00}(Ni_{0.85}Co_{0.10}Al_{0.05})O_2$ | 1.0 | 5.2 | Yes | Secondary particle | 178 | 87 | Good |
| Example 5 | $Li_{1.00}(Ni_{0.85}Co_{0.10}Al_{0.05})O_2$ | 10.0 | 7.8 | Yes | Secondary particle | 192 | 94 | Good |
| Example 6 | $Li_{1.00}(Ni_{0.85}Co_{0.10}Al_{0.05})O_2$ | 15.0 | 9.0 | Yes | Secondary particle | 186 | 90 | Good |
| Example 7 | $Li_{1.00}(Ni_{0.85}Co_{0.10}Al_{0.05})O_2$ | 30.0 | 11.5 | Yes | Secondary particle | 174 | 85 | Good |
| Example 8 | $Li_{1.00}(Ni_{0.80}Co_{0.10}Mn_{0.10})O_2$ | 5.0 | 5.8 | Yes | Secondary particle | 193 | 92 | Good |
| Example 9 | $Li_{1.00}(Ni_{0.80}Co_{0.10}Mn_{0.10})O_2$ | 2.5 | 5.4 | Yes | Secondary particle | 189 | 89 | Good |
| Example 10 | $Li_{1.00}(Ni_{0.80}Co_{0.10}Mn_{0.10})O_2$ | 7.5 | 6.4 | Yes | Secondary particle | 191 | 91 | Good |
| Example 11 | $Li_{1.00}(Ni_{0.80}Co_{0.10}Mn_{0.10})O_2$ | 1.0 | 5.1 | Yes | Secondary particle | 181 | 85 | Good |
| Example 12 | $Li_{1.00}(Ni_{0.80}Co_{0.10}Mn_{0.10})O_2$ | 10.0 | 7.2 | Yes | Secondary particle | 192 | 93 | Good |
| Example 13 | $Li_{1.00}(Ni_{0.80}Co_{0.10}Mn_{0.10})O_2$ | 15.0 | 8.0 | Yes | Secondary particle | 187 | 87 | Good |
| Example 14 | $Li_{1.00}(Ni_{0.80}Co_{0.10}Mn_{0.10})O_2$ | 30.0 | 9.8 | Yes | Secondary particle | 182 | 84 | Good |
| Example 15 | $Li_{1.00}(Ni_{0.85}Co_{0.10}Al_{0.05})O_2$ | 5.0 | 5.9 | No | Secondary particle | 187 | 84 | Good |
| Example 16 | $Li_{1.00}(Ni_{0.85}Co_{0.10}Al_{0.05})O_2$ | 2.5 | 5.4 | No | Secondary particle | 183 | 80 | Good |
| Example 17 | $Li_{1.00}(Ni_{0.85}Co_{0.10}Al_{0.05})O_2$ | 7.5 | 6.7 | No | Secondary particle | 188 | 86 | Good |
| Example 18 | $Li_{1.00}(Ni_{0.85}Co_{0.10}Al_{0.05})O_2$ | 1.0 | 5.1 | No | Secondary particle | 176 | 77 | Good |
| Example 19 | $Li_{1.00}(Ni_{0.85}Co_{0.10}Al_{0.05})O_2$ | 10.0 | 7.3 | No | Secondary particle | 188 | 85 | Good |
| Example 20 | $Li_{1.00}(Ni_{0.85}Co_{0.10}Al_{0.05})O_2$ | 15.0 | 8.4 | No | Secondary particle | 181 | 79 | Good |
| Example 21 | $Li_{1.00}(Ni_{0.85}Co_{0.10}Al_{0.05})O_2$ | 30.0 | 10.7 | No | Secondary particle | 177 | 76 | Good |
| Example 22 | $Li_{1.00}(Ni_{0.85}Co_{0.10}Al_{0.05})O_2$ | 5.0 | 6.0 | Yes | Primary particle | 197 | 92 | Good |
| Example 23 | $Li_{1.00}(Ni_{0.85}Co_{0.10}Al_{0.05})O_2$ | 1.0 | 5.1 | Yes | Primary particle | 184 | 89 | Good |
| Example 24 | $Li_{1.00}(Ni_{0.85}Co_{0.10}Al_{0.05})O_2$ | 30.0 | 11.2 | Yes | Primary particle | 182 | 88 | Good |
| Example 25 | $Li_{1.00}(Ni_{0.85}Co_{0.10}Al_{0.05})O_2$ | 50 | 13.6 | Yes | Secondary particle | 171 | 82 | Good |
| Example 26 | $Li_{1.00}(Ni_{0.80}Co_{0.10}Mn_{0.10})O_2$ | 40 | 12.1 | Yes | Secondary particle | 180 | 81 | Good |
| Comparative Example 1 | $Li_{1.00}(Ni_{0.85}Co_{0.10}Al_{0.05})O_2$ | 0 | 3.6 | Yes | Secondary particle | 168 | 75 | Poor |
| Comparative Example 2 | $Li_{1.00}(Ni_{0.80}Co_{0.10}Mn_{0.10})O_2$ | 0 | 3.5 | Yes | Secondary particle | 178 | 78 | Poor |

As shown in Table 1, in the case of the lithium ion secondary batteries according to Examples 1 to 24, the DSC peak full width at half maximum was within a predetermined range. Accordingly, the effect that the capacity retention after 100 cycles had been enhanced was confirmed. On the other hand, in Comparative Examples 1 to 2, the DSC peak full width at half maximum was outside the predetermined range. Accordingly, desired characteristics were not obtained. It was also confirmed that when 1 to 30 wt % of a first compound represented by chemical formula $Li_x(Ni_yMa_{1-y})O_2$ ($0.95 \leq x \leq 1.05$, $0.70 \leq y \leq 0.95$, where Ma is at least one element selected from Co, Mn, V, Ti, Fe, Zr, Nb, Mo, Al, and W); and a second compound represented by chemical formula $LiVOPO_4$, wherein W>5.0° C., where W is a full width at half maximum of an exothermic peak obtained between 150° C. and 260° C. by differential scanning calorimetry (DSC)

performed on a mixture of the first compound and the second compound under a condition of 5° C./min, and the second compound has a content of 1 to 30 wt % with respect to a sum of a weight of the first compound and a weight of the second compound.

2. The positive electrode active material for a lithium ion secondary battery according to claim 1, wherein at least a part of a surface of a primary particle of the first compound is coated with the second compound so as to form a coating layer of the second compound in the part.

3. The positive electrode active material for a lithium ion secondary battery according to claim 1, wherein the primary particles of the first compound are aggregated so as to form a secondary particle, and at least a part of a surface of the secondary particle is coated with the second compound so as to form a coating layer of the second compound in the part.

4. A lithium ion secondary battery positive electrode comprising the positive electrode active material according to claim 1.

5. A lithium ion secondary battery comprising:

the lithium ion secondary battery positive electrode according to claim 4;

a negative electrode including a negative electrode active material;

a separator interposed between the positive electrode and the negative electrode; and a nonaqueous electrolyte.

* * * * *